United States Patent Office 2,995,831
Patented Aug. 15, 1961

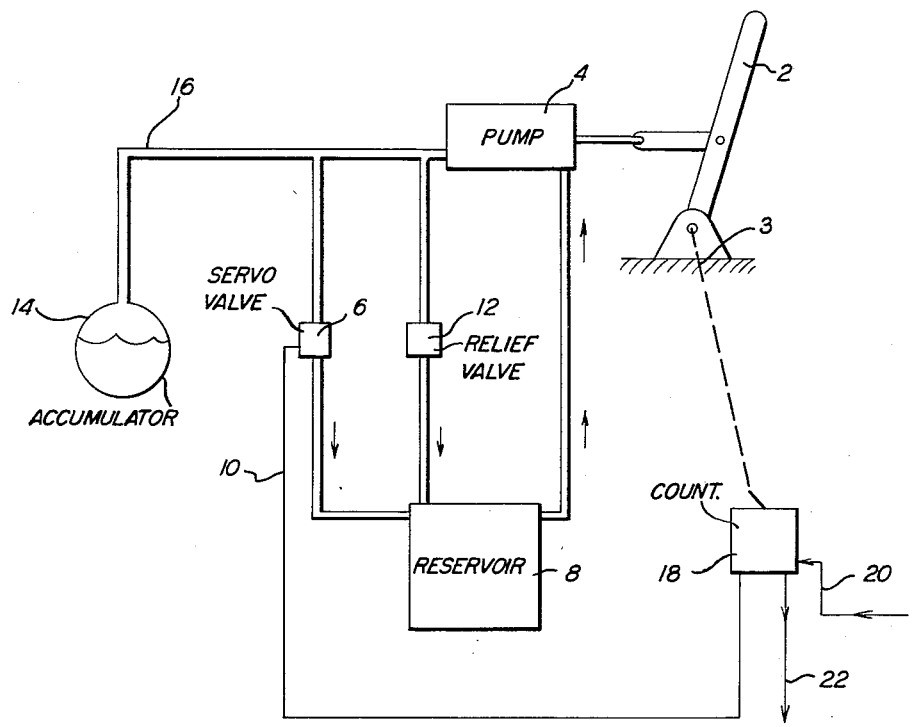

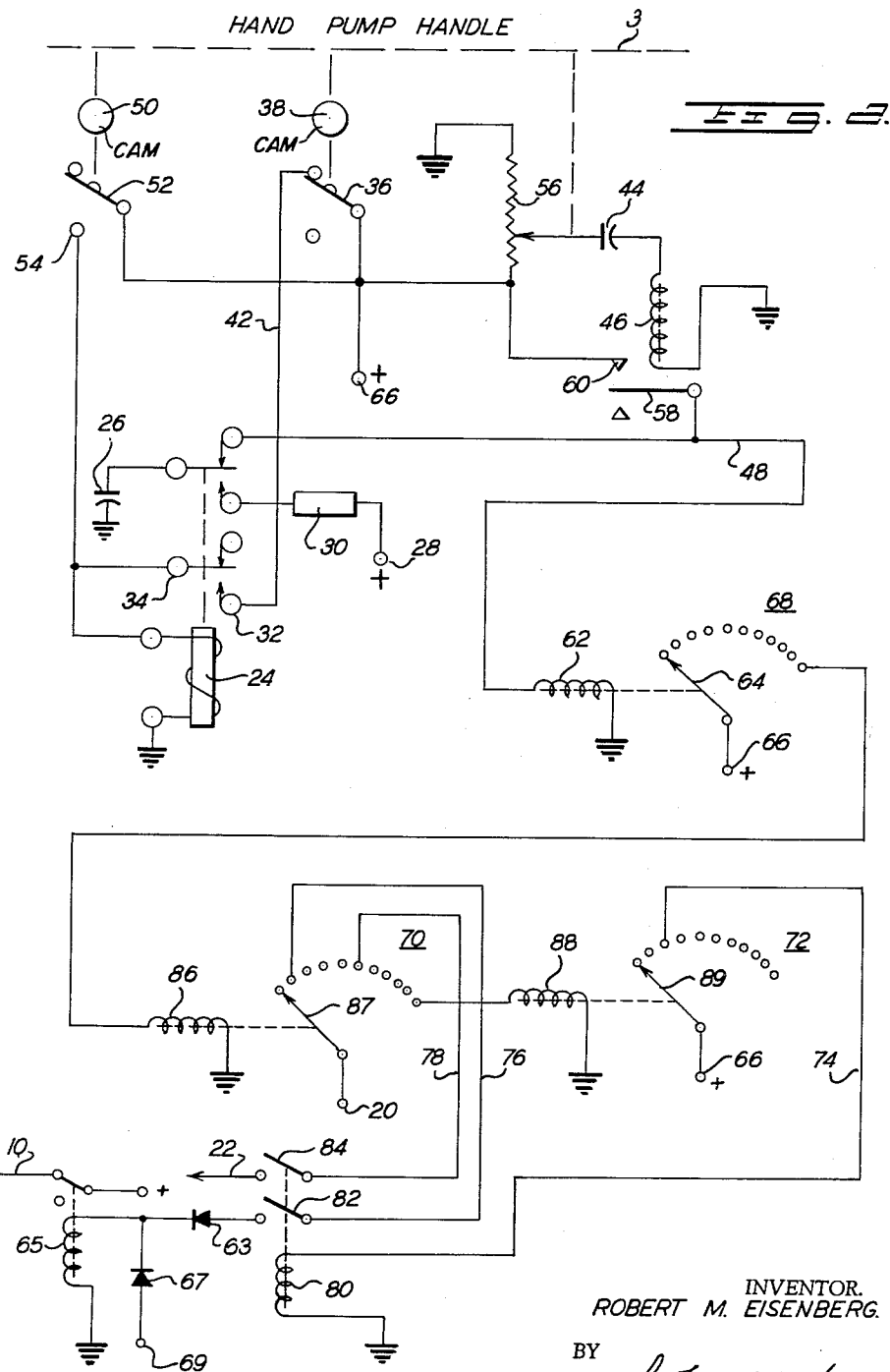

2,995,831
SECONDARY CONTROL FORCE SIMULATION
Robert M. Eisenberg, Rockville, Md., assignor to ACF Industries, Incorporated, New York, N.Y., a corporation of New Jersey
Filed July 7, 1958, Ser. No. 746,934
12 Claims. (Cl. 35—12)

This invention comprises apparatus for use with an aircraft flight simulator and more particularly for the control force simulation of a hydraulic system hand pump. The purpose of this invention is to realistically simulate the hand pump force reflected to the student pilot during normal and emergency operation of hydraulically operated actuators. For such simulation, the force required of the pilot in order to actuate the hydraulic system pump must vary in accordance with the pressure present in the accumulator and the load on the system due to the operation of various hydraulically operated devices or systems such as the main brakes, landing gear, bomb door, speed brakes and flaps.

Prior to this invention simulation of hydraulic system hand pumps was dependent upon direct spring loading or the use of a pneumatic cylinder connected with the hand pump so as to move a piston in a cylinder to force air through a restriction at the extremity of the cylinder so as to offer some resistance to the hand pump movement. This system resulted in the force varying as a function of control movement rate and the producing of an unrealistic spongy feel. Since one of the primary uses for flight simulators is to instruct pilots in emergency procedures the pneumatic system does not satisfy the need for having a variable force reflected to the pilot so as to simulate all phases of the hydraulic system operation.

This invention utilizes the hand pump of the simulated aircraft in a closed hydraulic system in which pressure is built up as a function of simulated aerodynamic loads and simulated actuator positions peculiar to the aircraft simulated. This is accomplished by the use of a counting device to determine the number of strokes of the hand pump handle, and from this counter control a force buildup voltage to activate an electric solenoid valve in the hydraulic system line.

It is therefore the broad object of this invention to provide a force simulation system in which the force reflected to the operator is a function of any force desired.

It is another object of this invention to provide variable force needs at a hand pump so as to simulate the operation of an aircraft hydraulic system.

It is a further object of this invention to provide hydraulic system simulation having a hand pump and counting device for controlling the magnitude of force reflected to the hand pump.

It is a further object of this invention to have an electrically controlled hydraulic system capable of presenting a variable force to a hand pump in a simulated hydraulic system.

It is a further object of this invention to provide a simulated hydraulic system comprising a closed hydraulic system loop having a hand pump, a counting device activated by the hand pump which in turn controls electrically the pressure present in the hydraulic system.

It is a still further object of this invention to provide a simulated hydraulic system comprising a closed hydraulic system having a hand pump, a counting device activated by the hand pump capable of determining whether complete or partial strokes of the hand pump have occurred and capable of controlling the pressure present in the hydraulic system in accordance with the strokes counted.

The novel features of the invention are set forth in the appended claims and the invention as to its organization and its mode of operation will best be understood from a consideration of the following detailed description of the preferred embodiment when used in connection with the accompanying drawings which are hereby made a part of the specification and in which:

FIG. 1 is a representation of the control force simulation system.

FIG. 2 is a schematic of the counter and control relay.

The preferred embodiment of this invention provides for the simulation of a hydraulic system by providing apparatus including a closed hydraulic circuit with associated hand pump stroke counting circuitry and an electric solenoid valve whereby the force reflected to the hand pump handle of the hydraulic system is controlled by the output of the stroke counting device. One unique feature of the invention is that the counter is capable of discerning whether a full fore and aft stroke or merely a partial stroke has been made by the student pilot in operating the hydraulic system hand pump.

In the following detailed description of the apparatus by which the objects of the invention are realized it should be remembered that the primary object of the invention is to provide a force at the hand pump handle such as to vary the ease of movement of the handle in accordance with the operation of hydraulic systems in the simulator and in accordance with the number and length of strokes taken by the student pilot in moving the hand pump handle.

The principle of operation is best explained by reference to FIG. 1. Operating the hand pump handle 2 circulates hydraulic fluid through the closed system consisting of the pump 4, a servo valve 6, and the reservoir 8.

An electrical connector 20 conducts a potential to the counter 18 whenever the operator activates a control member or switch to simulate the turning on of a simulated device or system which would require hydraulic pressure if it were an actual system.

There are provisions for two output potentials from the counter. These outputs may occur simultaneously or at different times, depending on the particular simulated system which may be activated by the student. One output lead, 22, conducts a potential to indicia apparatus to indicate to the operator that the system which he has energized is operating. The second output lead 10, when a potential is applied to it, activates the electric solenoid valve 6 so as to allow hydraulic fluid to circulate freely through the system as the hand pump is operated. Both of the output potentials are controlled by the counter 18 which counts the number of strokes of the hand pump.

The hydraulic circuit comprises the hand pump handle 2, a pump 4 whose piston exerts pressure upon hydraulic fluid when the hand pump is moved, a pressure line 16 which is connected to the accumulator 14, the electric solenoid valve 6 and the relief valve 12, a reservoir 8 and a return line to the pump. The mechanical linkage 3 interconnects the hand pump handle 2 with the counter 18. The servo valve is arranged in such a way as to require the pressure at the output of the hand pump to bear a definite relationship to the applied signal voltage before the hydraulic fluid can be passed through the servo valve to the reservoir. In this manner input signals in the form of voltages elsewhere computed can be used at terminal 69 of FIG. 2 to accurately control the hand pump force. The invention includes the stroke counting device 18 arranged so that an electrical signal is produced after the correct number of hand pump strokes required to operate the system are completed.

Under emergency conditions the actual hydraulic system would be de-pressurized due to loss of engine driven pumps. To simulate this, if an attempt is made to operate a system requiring hydraulic pressure, the electric solenoid valve 6 is energized to permit the hydraulic fluid to circulate freely through the system as the hand pump is operated. This requires very little student pilot effort as no pressure is built up in the system. When the correct number of total strokes of the hand pump is reached the system requiring hydraulic pressure is operated and the solenoid valve 6 is de-energized. This simulates the bottoming of the actuating piston in the system hydraulic actuator. The pilot then commences to charge the accumulator by further operations of the hand pump until a force equal to that found in the aircraft simulated is reached. The maximum force obtainable is governed by the relief valve 12. Any tendency to overcharge the system is prevented by the opening of the relief valve 12 which maintains the accumulator 14 pressure at the predetermined maximum. In systems operable by hydraulic pressure and which operate an aircraft surface into the slipstream, force build-up would occur before the system is completely operated. To simulate this the stroke counting device is arranged to remove the energizing voltage to the solenoid valve at the proper number of strokes causing a force build-up before the system is completely operated.

The counting device is so arranged that the correct count of complete strokes of the hand pump handle is obtained only by operating the handle of the hand pump 2 from the extreme forward to the extreme aft position. Since it is possible to pump hydraulic pressure sufficient to operate the systems without the necessity of making full strokes, provisions for this are included. Attempting to operate systems such as landing gear, bomb bay doors, speed brakes and flaps without making full and complete strokes will result in the requirement that a greater number of strokes must be made. FIG. 2 shows schematically the system for counting strokes of the hand pump.

Moving the hand pump handle to the full forward position rotates the linkage 3 to a position whereby cam 50 closes switch 52 onto contact 54 to apply the potential at terminal 66 to the energizing coil of relay 24. This causes capacitor 26 to charge from the D.C. source 28 through the current limiting resistor 30. Relay 24 remains energized through its normally open contacts 32 and 34 arranged in series with switch 36 on the hand pump handle and the potential source 66. The switch 36 is so arranged that it will be operated by cam 38 so as to remove the voltage present from terminal 66 to the conductor 42 only when the hand pump handle is in its extreme aft position. Moving the handle aft from its forward position causes the arm on the potentiometer 56 to approach the potential source 66 and thereby charge the capacitor 44 through relay 46, closing the contacts 58 of relay 46 which applies the voltage from terminal 66 to the counter bus 48. This is the first pulse to the coil 62 which steps the arm 64 one position. When the pump handle reaches the full aft position switch 36 opens causing relay 24 to de-energize, thereby applying a 28 volt D.C. pulse from capacitor 26 to the counter bus 48. Since relay 46 opened as the handle reached the aft travel this is the second count obtained when the handle has operated a complete cycle. In this manner two counts are obtained with full travel of the handle while only one count or pulse will be generated by movements other than a complete cycle. This feature of accounting for both complete and partial stroke movements of the hand pump handle realistically monitors the force build-up control voltage which activates the electric solenoid valve.

The pulses appearing on the counter bus 48 are conducted to the coil 62 of unit stepping relay 68 which moves the arm 64 clockwise one position with each pulse. When the arm 64 reaches the last contact, the coil 86 of decade stepping relay 70 is energized so as to move the arm 87 clockwise one contact. Simultaneously with this, the unit relay 68 is reset to the extreme left contact. By this means relay 68 acts as a unit counter and relay 70 as a counter of ten, i.e. a one step movement of relay 70 indicates a count of ten or that five complete or ten partial strokes of the hand pump have been made. In a like manner relay 72 counts by hundreds. When ten movements of the decade relay 70 have occurred arm 87, which is tied to conductor 20 is connected to the coil 88 of relay 72. Conductor 20 is energized with a potential only when the student pilot has operated a control or switch for the purpose of operating a simulated system which requires hydraulic pressure.

Conductors 74, 76 and 78 are arranged as one example of the interrelation operation of the counter to the hydraulic circuit. Assume the requirement to be that a system requiring hydraulic pressure is simulated which under emergency hand pump operation will begin to build up pressure after 210 strokes (210 partial strokes or 105 full strokes) and will begin to operate the system after 250 strokes (250 partial strokes or 125 full strokes). Conduction from source 66 through arm 89 to conductor 74 will energize relay 80 closing switches 82 and 84 after 200 strokes of the hand pump have been made. Potential will appear on conductors 76 and 78 after ten and fifty more strokes occur, i.e., at the end of 210 and 250 stroke, and the potential on the conductor 76 will be conducted through rectifier 63 to relay 65 and the potential on the conductor 78 will be conducted to the operation indicator by lead 22. Terminal 69 conducts a potential through rectifier 67 to relay 65 whenever there is hydraulic pressure present in the simulated aircraft due to the operation of the engine driven pumps. If relay 65 is energized conductor 10 carries no potential to energize the solenoid valve and therefore movement of the hand pump will be limited by the pressure in the system.

By these means a force simulation system utilizing a hydraulic circuit is provided whereby the force reflected to the operator being trained is variable and in conformity with the force which would be present under operating conditions of an actual apparatus.

It may thus be seen that this invention provides a realistic simulation of large hydraulic systems with a minimum of component parts and while maintaining the accuracy of the magnitude of force required to increase the pressure in the system.

It should be understood that this invention is not limited to specific details of construction and arrangement thereof herein illustrated and that changes and modifications may occur to one skilled in the art without departing from the spirit of the invention. The scope of the invention being set forth in the following claims.

What is claimed is:

1. In a training device, a hydraulic system comprising an interconnecting hydraulic circuit, counting and relay means, said hydraulic circuit having a reservoir of hydraulic fluid, an accumulator to retain pressure, a solenoid valve, a relief valve to prevent over-pressurizing, a pump including a handle accessible to a student and coupled to actuate said counting and relay means, and hydraulic lines interconnecting said reservoir, accumulator, pump, solenoid and relief valve to form a hydraulic circuit whereby force is allowed to build up upon reaching the desired number of pump strokes as indicated by said counting means, so as to restrain movement of the pump handle in accordance with the magnitude of the force developed.

2. In a training device, a hydraulic system comprising an interconnecting hydraulic circuit, counting means and relay means, said hydraulic circuit having at least a hand pump with handle to which the pressure in the hydraulic circuit is applied, said counting means having switches and stepping devices operative in accordance with the movement of the pump handle so as to count the number of movements of the handle whether complete or partial movements to activate the said relay means and means connected to said relay means for controlling the force present in the hydraulic circuit.

3. In a trainer having control members operative by a student to indicate the operation of a hydraulically operated device, and having means for indicating the operation of said device, a hydraulic control force simulation system comprising a hydraulic circuit, counting means and relay means, said hydraulic circuit having at least a hand pump with handle, said relay means interconnecting said counting means and said hydraulic circuit so as to allow force to begin to build up in the hydraulic system in response to operation of the pump after completion of a desired number of strokes of the pump handle, said relay means operative in conjunction with said counting means so as to allow an enabling signal to pass to said hydraulic device indicating means so as to inform the student that the hydraulic device is then operating.

4. In a trainer having control members operative by a student to indicate the operation of a hydraulically operated device, and having means for indicating the operation of said device, a hydraulic control force simulation system comprising a hydraulic circuit, counting means and relay means, said hydraulic circuit having a reservoir of hydraulic fluid, an accumulator to retain pressure, a solenoid valve, a relief valve to prevent over-pressurizing, a pump including a handle accessible to the student, and hydraulic lines interconnecting said reservoir, accumulator, pump, solenoid and relief valve so as to form a hydraulic system, said counting means having switches and stepping devices operative in accordance with the movement of the pump handle so as to count the number of movements of the handle whether complete or partial movements, said relay means interconnecting said counting means and said solenoid valve to operate the solenoid valve after the desired number of pump strokes so as to allow a force to build up in the hydraulic system upon reaching the desired number of strokes, said relay means operative in conjunction with said counting means so as to allow an enabling signal to pass to said hydraulic device indicating means so as to inform the student that the hydraulic device is then operating.

5. In a flight simulator of the type having hydraulic systems for operating control members and wherein the force exerted by a trainee varies in accordance with simulated hydraulic demands and with the number and length of pump strokes; the combination comprising a pump handle, a closed hydraulic system comprising a pump connected to said handle, a servo valve, and a reservoir, a counting device connected to the handle to count the strokes made by the trainee, and means to connect the counting device to the said servo valve to operate the same and thereby build up system pressure in accordance with signals from the said counting device.

6. The invention as set forth in claim 5 including a circuit for applying a voltage to said last named means to disable the servo valve to simulate normal engine pump operation.

7. The invention as set forth in claim 6 wherein the said counting device includes means to count full or partial pump handle strokes.

8. The invention as set forth in claim 7 wherein the said counting device includes stepping switches operative in accordance with movement of the pump handle.

9. The invention as set forth in claim 8 including a relief valve in the said closed hydraulic system to limit the maximum pressure in the system.

10. A training device having a control member to simulate the operation of a hydraulically operated system comprising a pump, an accumulator, means coupling said pump to said accumulator, a reservoir, a solenoid valve and a relief valve in parallel and coupled between said reservoir and said coupling means, passage means between said reservoir and said pump, circuit means, means coupled to said control member to actuate said pump and said circuit means, said circuit means comprising relay means and a plurality of series connected stepping switches actuated by said control member, said relay means coupled between the last of said series stepping switches and said solenoid valve to actuate said valve when said series connected stepping switches have reached a predetermined position.

11. The combination as defined in claim 10 wherein said circuit means includes capacitive means in circuit with said stepping switches for passing pulses to said switches.

12. A system for actuating an electromagnetic valve in a closed loop hydraulic device comprising a first actuator and a second actuator, a plurality of series connected stepping switches, a first charging circuit coupled between said first actuator and said first of said series connected stepping switches, a second charging circuit coupled between said second actuator and said first of said series connected stepping switches, operating means coupled between the last of said series connected stepping switches and said electromagnetic valve, a source of potential coupled to said first and said second actuators, and means to control said actuators to charge and discharge said charging circuits to progressively advance said stepping switches to a preselected position wherein said electromagnetic valve is actuated.

References Cited in the file of this patent

UNITED STATES PATENTS

| | | |
|---|---|---|
| 2,510,500 | Hayes et al. | June 6, 1950 |
| 2,516,803 | Rippere | July 25, 1950 |
| 2,519,698 | Pearsall | Aug. 22, 1950 |
| 2,669,096 | MacDuff | Feb. 16, 1954 |
| 2,674,092 | Gardiner | Apr. 6, 1954 |
| 2,851,795 | Sherman | Sept. 16, 1958 |